(12) United States Patent
Havonen et al.

(10) Patent No.: US 12,378,445 B2
(45) Date of Patent: Aug. 5, 2025

(54) DIRECT COATING AND DRYING PATTERNED ADHESIVE ON DIRECT THERMAL FACE

(71) Applicant: UPM Raflatac Oy, Tampere (FI)

(72) Inventors: Markku Havonen, Wrocław (PL);
Marko Tiainen, Jyväskylä (FI);
Katarzyna Wojtuś, Wrocław (PL)

(73) Assignee: UPM RAFLATAC OY, Tampere (FI)

( * ) Notice: Subject to any disclaimer, the term of this patent is extended or adjusted under 35 U.S.C. 154(b) by 149 days.

(21) Appl. No.: 17/928,310

(22) PCT Filed: Jun. 17, 2020

(86) PCT No.: PCT/FI2020/050437
§ 371 (c)(1),
(2) Date: Nov. 29, 2022

(87) PCT Pub. No.: WO2021/255324
PCT Pub. Date: Dec. 23, 2021

(65) Prior Publication Data
US 2023/0203348 A1    Jun. 29, 2023

(51) Int. Cl.
*C09J 7/38* (2018.01)

(52) U.S. Cl.
CPC ........... *C09J 7/38* (2018.01); *C09J 2203/334* (2013.01); *C09J 2301/204* (2020.08); *C09J 2301/312* (2020.08)

(58) Field of Classification Search
CPC .. C09J 7/38; C09J 2203/334; C09J 2301/204; C09J 2301/312
See application file for complete search history.

(56) References Cited

U.S. PATENT DOCUMENTS

| 4,889,234 A | 12/1989 | Sorensen et al. |
| 5,154,974 A | 10/1992 | Norman et al. |

(Continued)

FOREIGN PATENT DOCUMENTS

| CN | 111986555 A | 11/2020 |
| DE | 2906284 A1 | 8/1980 |

(Continued)

OTHER PUBLICATIONS

International Preliminary Report on Patentability for the corresponding International Application No. PCT/FI2020/050437; International Filing Date: Jun. 17, 2020; Date of Completion: May 25, 2022; 5 pages.

(Continued)

*Primary Examiner* — Cynthia L Schaller
(74) *Attorney, Agent, or Firm* — CANTOR COLBURN LLP (57) ABSTRACT

A method for manufacturing a linerless label web (100, 200, 500) comprising a direct thermal printable coating and a patterned pressure sensitive adhesive (120) is provided. The method comprises arranging a substrate comprising the direct thermal printable coating as a face stock (110, 510, 610, 710), applying water-based adhesive coating (520a, 620a, 720a) onto the face stock (110, 510, 610, 710), providing the face stock (110, 510, 610, 710) with alternating adhesion areas and adhesion-free areas in a transversal direction of the face stock, ensuring the adhesion-free areas with a pre-determined level of moisture, and thermally drying the water-based adhesive coating (520a, 620a, 720a) into the pressure sensitive adhesive (120).

12 Claims, 5 Drawing Sheets

(56) References Cited

U.S. PATENT DOCUMENTS

| | | |
|---|---|---|
| 5,661,099 A | 8/1997 | Mitchell, Jr. |
| 5,674,626 A | 10/1997 | Khatib et al. |
| 5,725,320 A | 5/1998 | Austin et al. |
| 5,840,657 A | 11/1998 | Mehta et al. |
| 5,922,402 A * | 7/1999 | Speeney .................. B05D 1/28 427/428.14 |
| 6,585,437 B1 | 7/2003 | Wiklof et al. |
| 6,830,795 B1 | 12/2004 | Downs |
| 6,890,112 B2 | 5/2005 | Kline |
| 8,338,516 B1 | 12/2012 | Parr et al. |
| 8,537,184 B2 | 9/2013 | Roth et al. |
| 8,711,190 B2 | 4/2014 | Roth et al. |
| 8,846,182 B2 | 9/2014 | Kakihara et al. |
| 9,403,392 B2 | 8/2016 | Roth et al. |
| 10,217,384 B2 | 2/2019 | Roth et al. |
| 11,224,043 B1 | 1/2022 | Roth et al. |
| 2005/0255298 A1 | 11/2005 | Crum |
| 2006/0216451 A1 | 9/2006 | Weiner et al. |
| 2007/0267146 A1 | 11/2007 | Vigunas et al. |
| 2009/0169282 A1 | 7/2009 | Keeton |
| 2010/0015374 A1 | 1/2010 | Fulwiler |
| 2013/0230672 A1* | 9/2013 | Vigunas ................ B41M 5/423 428/32.39 |
| 2015/0159054 A1 | 6/2015 | Wild et al. |
| 2021/0395965 A1 | 12/2021 | Araki et al. |
| 2022/0073791 A1 | 3/2022 | Schonrock |
| 2022/0097337 A1* | 3/2022 | Tiainen ..................... G09F 3/02 |
| 2022/0208026 A1 | 6/2022 | Havonen et al. |

FOREIGN PATENT DOCUMENTS

| | | |
|---|---|---|
| DE | 202004018325 U1 | 3/2005 |
| EP | 1407994 A1 | 4/2004 |
| EP | 1577860 B1 | 9/2010 |
| EP | 2551838 A1 | 1/2013 |
| GB | 2345685 | 7/2000 |
| JP | H09106250 A | 4/1997 |
| JP | 2003003134 A | 1/2003 |
| JP | 2007171776 A | 7/2007 |
| JP | 2013011647 A | 1/2013 |
| WO | 9118739 A1 | 12/1991 |
| WO | 9315159 A1 | 8/1993 |
| WO | 9631861 A1 | 10/1996 |
| WO | 9917906 A1 | 4/1999 |
| WO | WO 2008/040852 A1 * | 4/2008 |
| WO | 2009126328 A2 | 10/2009 |
| WO | 2016012652 A1 | 1/2016 |

OTHER PUBLICATIONS

Written Opinion for the corresponding International Application No. PCT/FI2020/050437; International Filing Date: Jun. 17, 2020; Date of Mailing: Feb. 19, 2021; 7 pages.

* cited by examiner

DIRECT COATING AND DRYING PATTERNED ADHESIVE ON DIRECT THERMAL FACE

CROSS-REFERENCE TO RELATED APPLICATIONS

This application is a National Stage application of PCT/FI2020/050437, filed Jun. 17, 2020, which is incorporated by reference herein in its entirety.

TECHNICAL FIELD

This specification relates to a method for manufacturing a linerless label web comprising direct thermal printable coating and a patterned pressure sensitive adhesive.

BACKGROUND

Traditionally water based pressure sensitive adhesives have been difficult to use in linerless labels which comprise direct thermal face materials. There are limits for the highest temperatures that the direct thermal face materials can be exposed to in order to prevent unwanted and premature colour changes of the thermally sensitive coating.

This can be certain extent designed around by selecting a thermal face material having high enough activation temperature and then drying the adhesive at lower temperatures and perhaps additionally using lower adhesive coat weight. However, this sets limitations to the usable coat weight and typically leads to longer curing/drying time which again reflect into manufacturing efficiency and speed. In addition, use of thermal face materials with higher activation temperatures limits the possibility to use such linerless labels in applications with economical and lower performance label printers where the print head performance might be limited and for example printing speed might become compromised if using label materials having higher activation temperatures.

Another possible approach is to dry the adhesive of the linerless label web separately, before attaching the adhesive onto the face substrate of the label. This, however, complicates the manufacturing process providing extra steps into it.

There is a need for an improved method for manufacturing label web and labels thereof comprising direct thermal face materials and water based pressure sensitive adhesives.

SUMMARY

It is an aim of this specification to provide an improved, yet simple method for manufacturing a linerless label web and labels thereof comprising water based pressure sensitive adhesive and direct thermal face materials. The method allows drying of the adhesive on the face without causing unwanted and premature colour changes to the thermally sensitive coating.

According to an embodiment, a method for manufacturing a linerless label web comprising a direct thermal printable coating and a patterned pressure sensitive adhesive is provided. The method comprises arranging a substrate comprising the direct thermal printable coating as a face stock, applying water-based adhesive coating onto the face stock, providing the face stock with alternating adhesion areas and adhesion-free areas in a transversal direction of the face stock, ensuring the adhesion-free areas with a pre-determined level of moisture, and thermally drying the water-based adhesive coating into the pressure sensitive adhesive.

BRIEF DESCRIPTION OF THE DRAWINGS

The figures are schematic. The figures are not in any particular scale.

DETAILED DESCRIPTION

The solution is described in the following in more detail with reference to some embodiments, which shall not be regarded as limiting.

In this specification term "comprising" may be used as an open term, but it also comprises the closed term "consisting of". Unit of temperature expressed as degrees C. corresponds to ° C. Percentage values relating to an amount of a material are percentages by weight (wt. %) unless otherwise indicated. Following reference numbers and denotations are used in this specification:

Sx, Sy, Sz 3D coordinates
100, 200, 500 linerless label web
110, 510, 610, 710 face
120 pressure sensitive adhesive
130, 530, 630, 730 release coating
240 label printer
401 step
402 step
403 step
404 step
405 step
520a, 620a, 720a water-based adhesive coating
560 drying unit
561 drying device
570 linerless label web roll
580, 680, 780 coating unit
590, 690, 790 unit Term "web" refers to a continuous sheet of material. The web is generally processed by moving over rollers. Between processing stages, webs may be stored and transported as rolls.

Term "machine direction" refers to manufacturing direction of a web. Machine direction may also refer to a circumferential direction of a roll. Term "cross direction" or "cross machine direction" or "transversal direction" refers to a direction that is transversal to the machine direction. Longitudinal direction of a web refers to the machine direction.

A label is a piece of material to be applied onto articles of different shapes and materials. An article may be a package. A label comprises at least a face material also referred to as a face stock or a face. A typical way to adhere the label onto an article is by use of adhesive. The label comprising an adhesive layer is referred to as an adhesive label. The adhesive may comprise pressure sensitive adhesive (PSA). A label comprising pressure sensitive adhesive may be referred to as a pressure sensitive adhesive label. Pressure sensitive adhesive labels may also be referred to as self-adhesive labels.

The labels comprising PSA can be adhered to most surfaces through an adhesive layer without the use of a secondary agent, such as a solvent, or heat to strengthen the bond. In that case the adhesive is pressure sensitive as such. Alternatively, the adhesive may be activatable in order to be pressure sensitive. The PSA forms a bond when pressure is applied onto the label at ambient temperature (e.g. between 15 and 35° C.) or for cold applications even under freezing temperatures below 0° C., adhering the label to the item to be labelled. Examples of pressure sensitive adhesives include water-based (water-borne) PSAs, solvent based PSAs and hot-melt PSAs. A label may further comprise other adhesive(s).

Face refers to a top substrate of the label, also called as a face stock or a face material. In case of a plastic face material it may also be called a face film. The face may have a monolayer or multilayer structure comprising at least two layers. The face is the layer that is adhered to the surface of an article during labelling through an adhesive layer. The face comprises an adhesive side and a print side. A combination comprising a face and an adhesive may be referred to as an adhesive label. The face may comprise e.g. print in order to provide information and/or visual effect. Printable face is suitable for printing by any of the known printing methods, such as with gravure, flexographic process, offset, screen or letter-press. The printing may exist on a top surface, reverse side or both top and reverse side of the face. Further, the label may contain additional layers, for example top coatings or overlaminates to protect the top surface and/or print of the label against rubbing or other external stress. Coating or additional layers, such as a primer, may enable enhancing compatibility of adjacent layers or parts of the label, for example adhesion between the layers. A label comprising a face, a print layer and an adhesive may be referred to as a printed label.

The label may be so-called linerless label. The linerless label comprises a face and an adhesive on the face. Alternatively the label may be a so-called shrink label, where heat shrinkable polymeric face material(s) are seamed and rolled on or sleeved around labelled articles and shrunk around the items. Shrinkable labels may comprise additionally some pressure sensitive adhesive(s) or those may be produced completely without pressure sensitive adhesive, or even without seaming adhesive. Further, the label may be an activatable linerless label, wherein the adhesive is activatable to be pressure sensitive, using for example additional heat, moisture or other activation means.

Labels may be used in wide variety of labelling applications and end-use areas, such as labelling of food, home and personal care products, industrial products, pharmaceutical and health care products, beverage and wine bottles, other consumables etc. Labels enable providing information, like product specification, on the labelled product(s). Information, e.g. print of a label, may comprise human-readable information, like image(s), logo(s), text, and/or machine-readable information, like bar code(s), QR (Quick Response) code(s). One important subcategory of labels using direct thermal printable face materials are so-called Variable Information Print (VIP) labels. These labels are at least partly printed just before dispensing them onto the item to be labelled and carry product specific information on that individual item to be labelled. VIP labels are used, for example, in retail weighting scales for fruits, vegetables, meat and other items sold per weight. Other labels which are individually printed per need are different type logistic labels containing shipment or product specific information, bus or train tickets or other tickets etc.

Direct thermal printable coating of the label face substrate has traditionally prevented utilizing water-based adhesives with linerless labels. Such adhesives are typically dried in order to evaporate water after the adhesive has been applied onto a face stock of a label. Use of water-based adhesive necessitates drying, while any heat sensitive layer or part of a label may prohibit drying or heating close or above the activation temperature of the heat sensitive layer. Drying with lower temperatures and lower coat weight (i.e. with less mass to be dried) may be possible, but without very careful selection of drying process parameters would in turn cause at least ineffectiveness and longer drying times and/or dimensions (length) of the drying chamber or oven.

The problem with the face material of a label comprising thermal paper arises from heat sensitivity of the thermal paper. Thermal coating of a thermal paper is activated using heat. This may prevent drying and/or heating water-based adhesive on a thermal paper, since heating may lead to activation and the thermal paper becoming blackish or causing less severe but unwanted visual changes. The partly or fully activated brownish or blackish thermal paper surface prevents providing a high quality visible print on it.

Even more severe problems arise when only a part of the face comprising the direct thermal paper is arranged to comprise the adhesive, thus leaving certain areas of the face without adhesive. Those areas without the adhesive would be even more prone to activation of the thermal paper while drying and/or heating the adhesive. Some label applications call for such patterned adhesive, sometimes also referred as pattern gumming.

This specification aims to provide an improved method for manufacturing label web and labels thereof comprising direct thermal face material and water based pressure sensitive adhesive. Particularly, aim is to provide a method for manufacturing a label web and labels thereof comprising patterned pressure sensitive water-based adhesive.

Linerless Label Web

Figure 1:
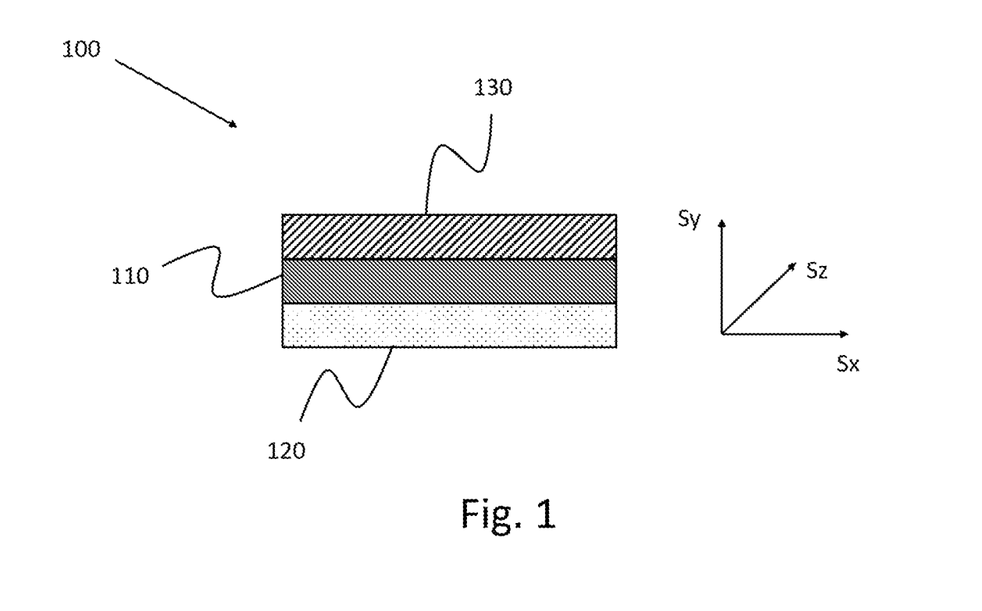
FIG. 1 illustrates, by way of an example, an $S_x,S_y$-cross-section of a linerless label web according to an embodiment.

FIG. 1 illustrates, by way of an example, an $S_x,S_y$-cross-section of a linerless label web 100. A label web refers to structure comprising a continuous face stock 110 and an adhesive 120 arranged on one side of the face stock. A label web is generally processed by moving over rollers. Between processing stages, the label web may be stored and transported as rolls. From the label web, individual labels may be cut. Linerless label web refers to a structure that does not comprise a separate release liner.

Linerless Label Printers

Figure 2:
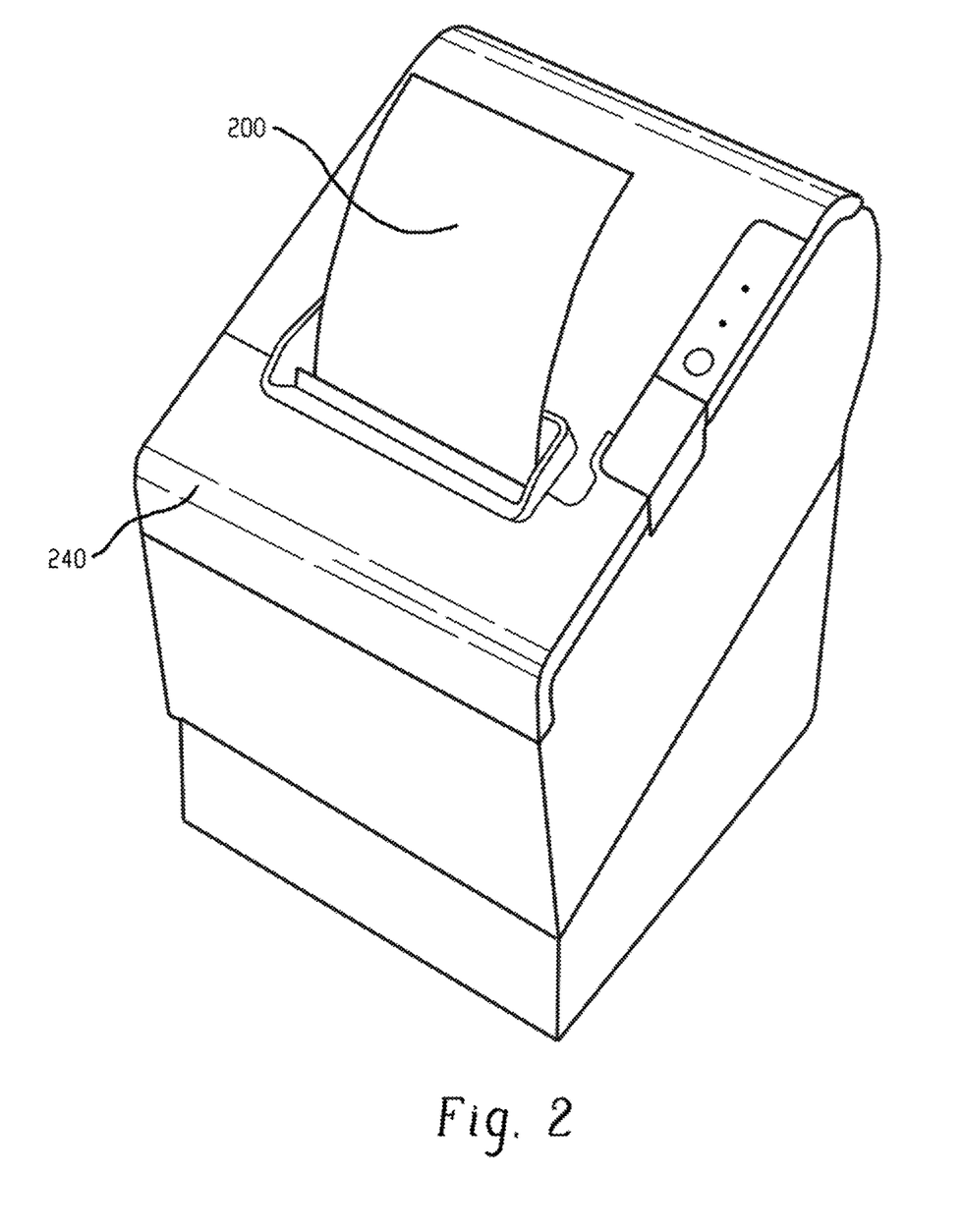
FIG. 2 illustrates, by way of an example, a schematic representation of a label printer 240 useable with linerless label web according to the disclosure.
Figure 3:
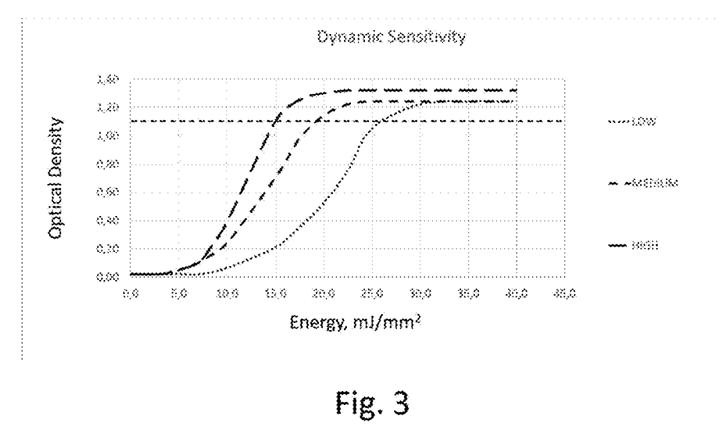
FIG. 3 illustrates, by way of an example, dynamic sensitivity behaviour of low/medium/high categorized direct thermal papers.

FIG. 2 shows schematically an example of a label printer 240 useable together with a linerless label web according to this disclosure. The label printer 240 may be called a linerless printer. Term "linerless printer" refers to a printer that is arranged to print linerless labels. The label printer 240 may be referred to as an on-demand label printer to emphasize that the printer may be used for printing the labels individually per need.

Business environments wherein such on-demand label printers are used typically call for very compact size and ease of use of those printer devices with minimal need for servicing. Firstly, this leads to solutions which utilize direct thermal printable label materials which themselves carry the thermally sensitive printable coating. This deviates from other non-direct thermal printing methods utilizing, for example, separate thermal print ribbons that need to be loaded into the printers and replaced after use accordingly. Secondly, this leads to technical solutions, wherein the number of individual components are selected to have minimal complexity. Preferably, the printer is also made very simple to use and has, for example, minimal need for any settings and adjustments.

Main functional parts inside such a compact linerless label printer may comprise: a mechanism for conveying a label web through the printer, a thermal print head for printing the individual labels onto the label web and a mechanism for separating individual labels from the label web and providing them for manual dispensing.

The mechanism for conveying the label web starting from unwinding the web from the label roll through all various parts of the printer and finally outputting the individual labels is typically a series of guidance rolls and guidance surfaces. To minimize both the size and complexity of such a unit, most of the rolls are freely running and perhaps only one or only a few of them are motorized in order to traction the label web forward during printing. These rolls or surfaces may not utilize any special friction lowering coatings for cost effective structure. The traction roll(s) may also comprise simple plastic or rubber roll without any special coating but solely with a surface roughened in order to ensure traction. Typically a single printer model is also designed to accept different widths of label rolls using a simple adapter to center the roll with respect to the web trajectory. Such a simple yet effective and economical printer design places severe demands on the label material in order to ensure smooth operation in customer service oriented work. Typical challenges are related to pressure sensitive label web sticking inside the printer to its various components and preventing smooth forward traction of the label web, and/or accumulation of adhesive residue onto printer components in prolonged use leading to the aforementioned problems and requiring cleaning of the printer components.

The thermal print head in this type of compact printers is typically selected to use lower print energies, i.e. less thermal energy may be transferred into the thermo-sensitive layers of the linerless label web. This is preferable in applications wherein short-lived labels are to be printed in a simple and economical manner. Even if the print heads could be adjusted for higher energy levels or temperatures, it may be preferable to run them on lower settings in order to maximize the use life of the thermal head/printer. It may also be that if the linerless label requires higher activation, the printing speed needs to be lowered due to the performance limitations of the printer.

In order to print, the thermo-sensitive linerless label web may be tractioned via a gap between the thermal head and a platen roller. The printer sends an electric current to the heating elements of the thermal head, which generate heat. The heat activates the thermo-sensitive colouring layer of the thermosensitive paper, which changes colour to black where heated. Such a printing mechanism is known as a thermal printing system or direct thermal printing system. The heating elements are usually arranged as a line of small closely spaced dots. The printing energy (temperature and/or exposure time) may be adjustable, but such adjustments tend to be tedious and preferably a direct thermal printable label material should be selected in order to work without a need to fine tune the printer properties. If more printing energy is required, this typically means that the printing speed is slowed down allowing the printing temperature to affect the label for longer time and therefore transferring more energy to the web. Therefore, the performance of the print head has an effect on selection of the thermal face material of the linerless label product in order to ensure good quality printing even with lower print energy/heat levels and higher printing speed.

The mechanism arranged in the output side of the printer for separating individual printed labels from the continuous linerless label web may comprise various types of electrically motorized cutting blades or guillotines or in many cases just simple non-movable serrated cutting blades. The latter requires the user to manually tear the label web against the serrated or toothed blade. In any case, the user needs to manually grasp the printed label that has been offered out from the printer. When using a non-motorized or non-assisted cutting mechanism, the user needs to rather firmly grip the label to manually separate it from the continuous web. This again places requirements for the label material so that it will not unnecessarily stick to the cutting mechanism of the printer or the fingers of the user who needs to be able to conveniently position the label into its first labelling position.

Direct Thermal Face

A face 110 may comprise paper comprising natural fibre(s) as its main raw material. The paper may be coated with one or more coating(s). The paper may also be uncoated. The paper may comprise, for example, one or more fillers and/or additives. Natural fibre refers to any plant material that contains cellulose. The natural fibre may be wood-based.

The face 110 comprises a thermal coating. The thermal coating is arranged to provide thermal printability for the face 110. The thermal coating is arranged to form a thermal sensitive, reactive layer changing colour during the thermal printing. The thermal coating comprises reactive components. The thermal coating may comprise a matrix. The matrix may comprise a dye and a developer. The face 110 may be called a thermally direct printable face.

The dye may comprise a leuco type dye. The thermal coating matrix in a solid state is heated by a thermal print head above its activation- and/or melting point. The leuco dye is arranged to react with an acid and change into a coloured form. Thermal coating may comprise a dye, a developer, a sensitizer, a binder, stabilizer.

Above activation temperature during thermal printing the developer is arranged to co-react with the dye. Reaction of the dye with the developer is arranged to trigger colour formation. Developer may comprise sulfonyl ureas, zinc salts of substituted salicylic acids or phenols, for example Bisphenol A (BPA) or Bisphenol S (BPS). The thermal coating may preferably be BPA free, Bisphenol (BP) free or Phenol free for increased chemical safety.

Sensitizer may be used in a thermal coating to decrease melting point of a dye and/or a developer. Dye and developer are arranged to react when heated above melting point of matrix of the thermal coating. The melting point of the matrix may depend on melting point values of its components. Thermal threshold of the thermal coating is melting point of the component of the thermal coating having the lowest melting point. Sensitizer of the thermal coating is arranged to decrease melting point of dye and/or developer.

This has effect of proving accuracy to the melting point and/or optimizing temperature of colour change and/or facilitating mixing of dye and developer.

Optionally the thermal coating may comprise stabilizers. Dyes in thermally sensitive paper may be unstable tending to return to their original colourless crystalline form. The thermal paper is sensitive to hot and humid external conditions, for example. In order to stabilize the metastable glass formed by leuco dye, developer and sensitizer, a stabilizer may be added to the mixture. Stabilizers have effect of inhibiting recrystallization of the dye and developer and/or stabilizing the print.

Binder of the thermal coating may have effect of facilitating the thermal coating to adhere to a base substrate or to a pre-coat. Binder may comprise double bonds. The binder may comprise polyvinyl alcohol (PVA) or latex, for example a styrene butadiene latex (SB) or a styrene acrylic (SA).

The face 110 may be pre-coated. A pre-coat may have effect of reducing heat transfer from a thermal coating to the substrate. This may enable enhanced or high resolution print to be formed. The pre-coat may have effect of providing smoothness to the substrate, i.e. the face. Smoothness of the face comprising paper has positive effect on printing, for example by providing better resolution. The pre-coat may have positive effect on printing quality.

Sensitivity of the thermal coating refers to the degree to which it reacts to a given amount of heat or energy. Sensitivity is a decisive factor in the selection of the right thermal coating or thermal paper. It may be depicted in graphs plotting a curve of image density or optical density (OD) against the amount of heat or energy transferred. Optical density is a measure of a relationship between incident and reflected light. An optical density of approximately 1.1 is usually a full black to the human eye. Lower optical densities thus correspond to varying shades of grey. Thermal coatings and thermal papers are typically characterized by using static and dynamic sensitivity.

Static sensitivity indicates the temperature at which a thermal paper will begin imaging, i.e. changing colour. Thermal papers with low static sensitivity only begin imaging at high temperatures, for example at above 90 degrees C. Thermal papers with medium static sensitivity on the other hand begin imaging at lower temperatures, for example at between 80 and 90 degrees C. High static sensitivity thermal papers start to react even at lower temperatures, for example at 65-80 degrees C., or at 70-80 degrees C.

Dynamic sensitivity of thermal papers indicates in practise how fast a thermal paper can be printed. This is especially relevant in the selection of the right thermal paper for a particular thermal printer, since the higher the dynamic sensitivity of the paper, the faster the printer can operate without any settings having to be changed. Dynamic sensitivity is typically indicated as $mJ/mm^2$. Thus, thermal papers with low dynamic sensitivity require higher print head temperature and/or longer exposure, i.e. slower printing speed to achieve high optical density of the image. On the other hand high dynamic sensitivities allow faster printing even with lower print head temperatures.

Dynamic sensitivity is challenging to categorise by using unambiguous, single numerical values (for example energy levels in $mJ/mm^2$) into low, medium and high categories because the total energy level delivered into the paper does not directly correspond to a certain temperature reached in the thermal coating. The heat capacity of the thermal paper is related, for example, to the thickness of the paper and existence of different material or material layers. Thus different amount of energy may be needed to heat papers having different thicknesses to the same temperature. Different paper thicknesses or thermal conductivity of various layers may cause different temperature levels in the thermal coating.

The thermally printable face may be further coated with a release coating 130 on top of the face, as illustrated in FIG. 1. Thermal printing may be made through this release coating 130. Said release coating 130 is intended to make the label material self-woundable, that is, the linerless label web 100 with pressure sensitive adhesive 120 on its one side (bottom side) and release coating 130 on its other side (top side) can be self-wound around itself without tendency of blocking the adjacent layers of the label web to each other.

The release coating 130 may comprise a silicone-based or non-silicone-based release coating. A silicone-based release coating may comprise UV curable silicone, for example UV free radical silicone or cationic UV silicone. The release coating 130 may comprise one or more layers of release coating.

Non-thermally curable release coatings are preferable, for example UV curable silicone, because curing of such layers will not heat the thermally sensitive materials in the thermally direct printable face.

It is also possible that no specific release coating is needed if the adhesion of the face substrate is low enough so that the pressure sensitive adhesive can be readily released from the face material upon unwinding the linerless label product roll.

A further function of the release coating may be that it provides lower friction against the print head of the printer and/or against other mechanical components of the printer minimizing wear of those components and minimizing adhesive residue built up.

According to an embodiment, the face 110 comprises paper and direct thermal coating. The face is coated with a silicone-based release coating 130. Moisture content of the face prior to label web manufacturing may be for example 5%±0.5%.

Pressure Sensitive Adhesive

The products disclosed herein comprise a pressure sensitive adhesive (PSA) coating arranged on a lower surface of the face opposite to its printable top surface. A pressure sensitive adhesive coating may also be called a self-adhesive coating. The pressure sensitive adhesive coating may comprise one or more layers of pressure sensitive adhesive. The PSA may be permanent adhesive or it may be removable or repositionable, or even ultra-removable. The PSA may have a working temperature from ambient to freezer temperatures.

Properties and characteristics of the PSA used herein may vary depending on the end use of the label in question. This is illustrated by Table 1 showing typical values and factors for the adhesives for different end uses.

TABLE 1

|  |  | Retail labelling | Logistic & warehouse | Industrial food | Quick service restaurant |
|---|---|---|---|---|---|
| Labelling environment | (degrees C.) | 18 . . . 25 | 10 . . . 25 | −2 . . . 8 | 18 . . . 30 |
| Labelling environment (substrate) | (degrees C.) | 8 . . . 25 | 10 . . . 25 | −20 . . . 8 | 8 . . . 60 |
| Environment (substrate) |  | dry | dry | condens. exists | condens. exists |
| Service temperature | (degrees C.) | 4 . . . 25 | 0 . . . 25 | −20 . . . 25 | 18 . . . 30 |
| Adhesive characteristics |  | permanent | permanent | permanent | removable |
| Adhesion (tack) | N/25 mm FTM9 | ≥8 | ≥17 | ≥10 | 3 . . . 6 |
| Coat weight (dry) | (g/m$^2$) | 15 . . . 20 | 18 . . . 25 | 15 . . . 20 | 15 . . . 20 |

Within context of this specification the PSA is water-based. Water-based adhesives provide better sustainability with less fossil based raw materials and less volatiles involved both during the manufacturing and during end use. These benefits can be seen, for example via Life Cycle Analysis for Cradle-to-Gate or Cradle-to-Grave. Further, it is easier to achieve good anchorage with water-based PSA onto the substrate, i.e. the face, disclosed herein even without any additional primer being used. Further, water-based adhesives may be designed to have approval for direct or indirect food contact (food-safety), which is a requirement in certain food related label end use areas.

The water-based PSA may be acrylic-based. The adhesive is preferably suitable for high coating speeds. Preferably, the adhesive gives reticulation free coatings at coat weights of 10-30 g/m$^2$ (dry coat weight). The adhesive may be plasticiser-free and may be used on thermal papers (including economy grades) without issues of premature image development or image fade. Preferably the adhesive exhibits sufficient anchorage to the face stock and resistance to face stock penetration, such that priming is not required. Flat adhesion profile over extended dwell-time and/or sufficient cohesion in order to resist winging on curved surfaces may be preferred.

According to an embodiment, the adhesive is a water-based PSA having a coat weight of from 15 to 25 g/m$^2$ (dry coat weight).

It should be noted that a certain coating thickness (coat weight) is needed in order to be able to coat the water-based PSA as a uniform, defect free layer onto the label face material. Simply lowering the adhesive coating thickness under a certain value in an effort to facilitate drying at lower temperatures and without increasing the drying time will lead to unsatisfied PSA quality and performance. Therefore, the disclosure herein aims to provide means for using high enough coating thickness (coat weight) together with high enough drying temperatures in order to achieve good PSA film quality and performance but yet to prevent overheating of the thermally sensitive coating. A certain target level of moisture is herein ensured to be present on all parts/areas of the label web before the web enters into the drying phase. During the drying phase the evaporation of that moisture maintains the web temperature below the activation temperature of the thermal coating both in the areas without adhesive/adhesion as well as areas with water-based adhesive/adhesion.

Label Web Manufacturing

Patterned adhesive refers to a situation wherein the adhesive covers less than 100% of the face surface. For example, the adhesive may cover between 10 and 90% of the total area of the face. The adhesive may be arranged for example as stripes along longitudinal direction of the label web. Thus, in transversal direction, i.e. in cross machine direction of the label web the face may comprise alternating areas with and without adhesive and/or with and without adhesion.

Arranging the adhesive in stripes in the longitudinal, machine direction of the label web may be essential in order to achieve necessary performance relating to certain end uses of the labels, such as with respect to on-demand printers and/or manual handling of the labels after printing. Arranging adhesion-free stripes/areas along longitudinal edges of the label and/or the label web may be of help in manual handling and/or dispensing of the label. The person handling and/or dispensing the label is enabled to grab the label without having to touch the adhesion area, thus maintaining one's fingers clean of the adhesive. Further, arranging adhesion-free stripes/areas along longitudinal edges of the label web is advantageous from the printer point of view, as said longitudinal edges may be the only parts of the label web arranged to be in contact with the printer. Therefore, contamination of the printer parts by the adhesive may be avoided or at least diminished. Further, in a case the label web contains more than one label width its slitting to label web rolls having a single label width may be cleaner, as the slitting may be performed along the adhesion-free stripes/areas. Finally, from the economic and environmental point of view it is favourable to provide the label/label web with the adhesive solely on parts of the label necessary for providing the desired adhesion.

Figure 4:
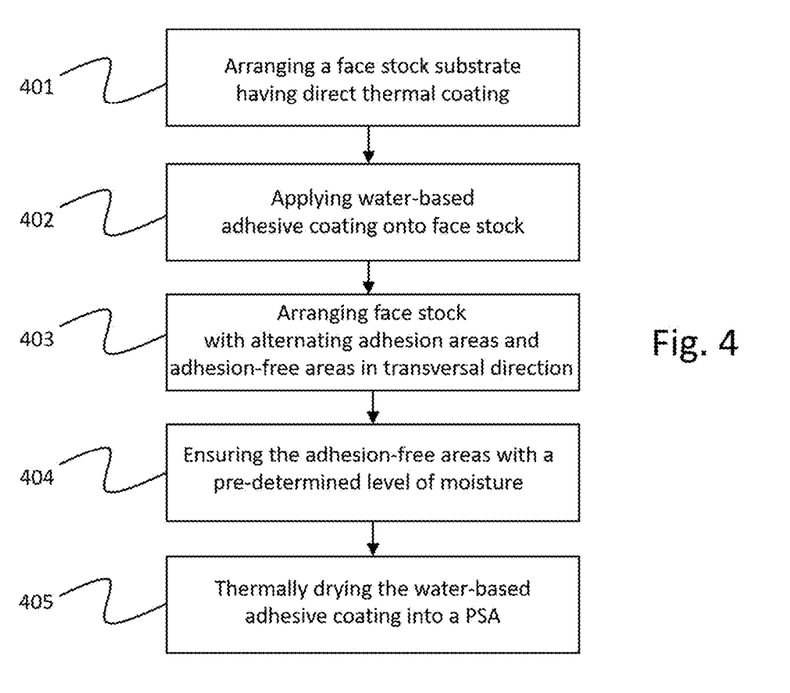
FIG. 4 illustrates, by way of an example, method steps according to an embodiment.

According to an embodiment and as illustrated in FIG. 4, a method for manufacturing a linerless label web comprising a direct thermal printable coating and a patterned pressure sensitive adhesive is provided. The method comprises arranging a substrate comprising direct thermal printable coating as a face stock (step 401), applying water-based adhesive coating onto the face stock (step 402), providing the face stock with alternating adhesion areas and adhesion-free areas in a transversal direction of the face stock (step 403), ensuring the adhesion-free areas with a pre-determined level of moisture (step 404) and thermally drying the water-based adhesive coating into the pressure sensitive adhesive (step 405). Step 404 may also refer to maintaining or arranging the adhesion-free areas with moisture. Steps 402-404 of the method may be performed simultaneously or stepwise.

Figure 5:
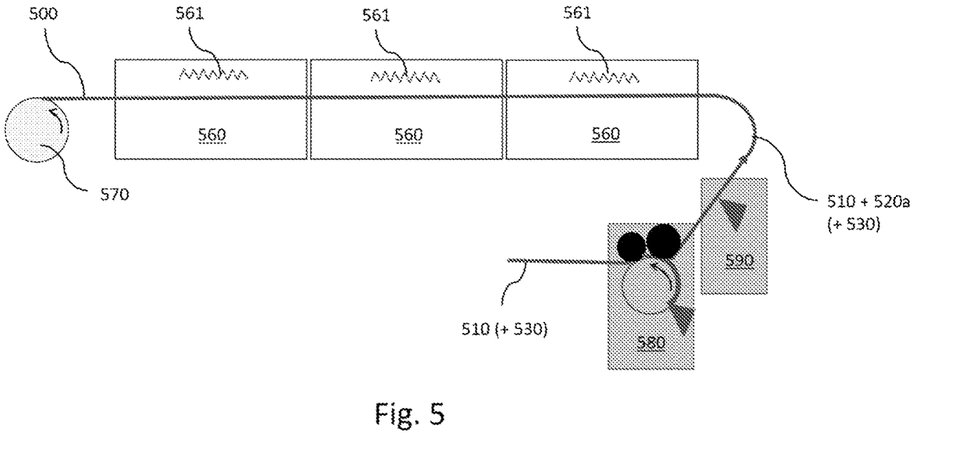
FIG. 5 illustrates, by way of an example, an embodiment of a manufacturing method and an apparatus.

FIG. 5 illustrates an apparatus according to an embodiment. The apparatus comprises a coating unit 580 for applying water-based adhesive coating 520a onto a face stock 510. Downstream of the coating unit 580 the apparatus comprises a unit 590 for adhesive removal and/or for providing moisture. Downstream of the unit 590 the apparatus comprises at least one drying unit 560 for drying the water-based adhesive coating 520a. The drying unit comprises at least one drying device 561. After the drying unit(s) the thus formed linerless label web 500 is arranged to be rolled onto a linerless label web roll 570.

Ensuring the adhesion-free areas with a pre-determined level of moisture has the effect that when drying the adhesive the moisture will evaporate, which evaporation prevents temperature of the thermal paper from increasing to values that would cause activation of the thermal paper.

Patterned adhesive may be provided by first applying the water-based adhesive coating 520a onto 100% area of the face stock 510 by the coating unit 580. After that some of the water-based adhesive coating 520a is removed from the face stock 510 so as to provide the face stock 510 with alternating adhesion areas and adhesion-free areas in the transversal direction of the face stock. Removing of the adhesive is performed before drying the adhesive in at least one drying unit 560. Removing of the adhesive may be performed by a unit 590. Adhesion areas may be called adhesive stripes. Adhesive removal in order to provide the face stock with adhesive stripes may be called pattern gumming.

Applying the water-based adhesive coating onto 100% area of the face stock provides the effect that also the areas wherefrom the adhesive is removed later on, will get moistened by the water contained by the adhesive. Thus, there may not be need to arrange moisture separately onto the adhesion-free areas of the face stock. When applying adhesive coating onto full area of the face stock water is absorbed into the face stock and small amount of adhesive is remaining on the face stock after pattern gumming also on the areas wherefrom the adhesive has been removed. Residual amount of the adhesive on the adhesion-free area may be about 0.5-2.0 g/m$^2$ or even 2.0-5.0 g/m$^2$. The residual amount of the adhesive is anyway so small, that after drying it does not provide significant adhesion properties, and thus is called adhesion-free.

The water-based adhesive coating may be applied onto the face stock using a contact coating method, such as roll coating. The adhesive coating may be applied by direct gravure coating. In direct gravure coating the adhesive transfer takes place directly from the gravure roll to the face stock. The adhesive may be removed from the face by a blade, such as a nylon blade.

The blade may be called a pattern gumming blade or a doctor blade. The blade may refer to any means suitable for removing adhesive from a web. The blade has the effect that while removing the adhesive, the blade simultaneously provides pressure to the face stock, thus pushing moisture, i.e. water contained by the adhesive into the face stock. Dry weight content of the adhesive coating that is removed from the web, i.e. the face stock, may differ from dry weight content of the adhesive coating applied onto the face stock. The dry weight content of the adhesive coating removed from the web may be from 0.1 to 5% lower compared to the dry weight content of the adhesive coating applied onto the web. In an example, the dry weight content of the adhesive coating removed from the web is 0.75% lower compared to the dry weight content of the adhesive coating applied onto the web. The residual amount of the adhesive coating on the adhesion-free areas together with the moisture transferred from the adhesive coating to the face stock have the effect that increase of the temperature of the thermal paper to values that would cause activation of it while drying the adhesive coating may be prevented.

Figure 6:
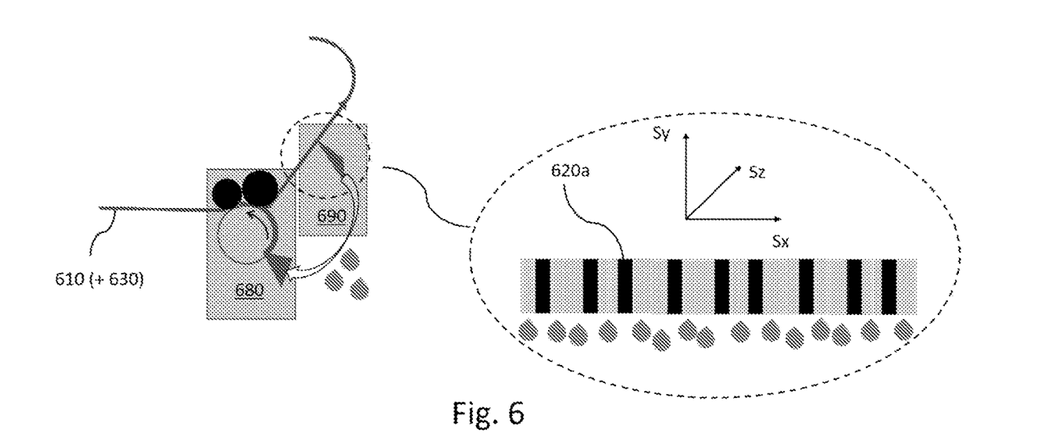
FIG. 6 illustrates, by way of example, a detail of a manufacturing method and an apparatus according to an embodiment.

FIG. 6 provides a detailed view of the method and the apparatus according to an embodiment. The water-based adhesive coating 620a is applied onto 100% area of the face stock 610 by the coating unit 680. After that some of the water-based adhesive coating 620a is removed from the face stock 610 so as to provide the face stock 610 with alternating adhesion areas and adhesion-free areas in the transversal direction of the face stock. Unit 690 is arranged to remove the adhesive coating in order to provide the face stock 610 with adhesive stripes visualized as black blocks in dashed enlargement of FIG. 6. The dashed enlargement illustrates the face stock having the adhesive coating thereon in Sx,Sz-plane. Grey droplets of FIG. 6 illustrate the adhesive coating removed from the face stock. Adhesive removed from the face stock may be collected and returned back to the coating unit, as illustrated by the curved arrow between the unit 690 and the coating unit 680.

According to an embodiment, the pattern gumming blade is arranged at an angle of almost 90° with respect to the web, i.e. the face stock. The blade may be arranged at a wiping angle of from 75 to 85°, for example of 80°, with respect to the web. The blade may be arranged in forward direction with respect to the web. The web tension may be 100-250 N/m. The web tension may be for example 150 N/m. A higher web tension and/or a higher wiping blade angle may be responsible for providing pressure to the face stock, thus pushing more water contained by the adhesive coating into the face stock while removing the adhesive. Web tension and blade angle also have effect to the amount of the adhesive removed from the face stock. Higher web tension and/or blade angle may be responsible for higher amount of adhesive to be removed from the face stock.

Machine speed of the process may be for example 100-600 m/min. Distance between applying the water-based adhesive coating and removing the water-based adhesive coating may be for example from 50 cm to 5 m. Dwell time between applying the adhesive coating and removing the adhesive coating may be for example from 0.05 to 3 seconds. In an example the machine speed of the process is 200 m/min and the distance between applying the adhesive coating and removing the adhesive coating is 70 cm. Thus, the dwell time between applying the adhesive coating and removing the adhesive coating is 0.2 seconds. The longer the distance between applying the adhesive coating and removing the adhesive coating, i.e. the distance between the coating unit 680 and the unit 690 and/or the dwell time, the longer the time for the adhesive to be in contact with the face stock, and thus the higher the moisture content transferred from the adhesive coating to the face stock.

Figure 7:
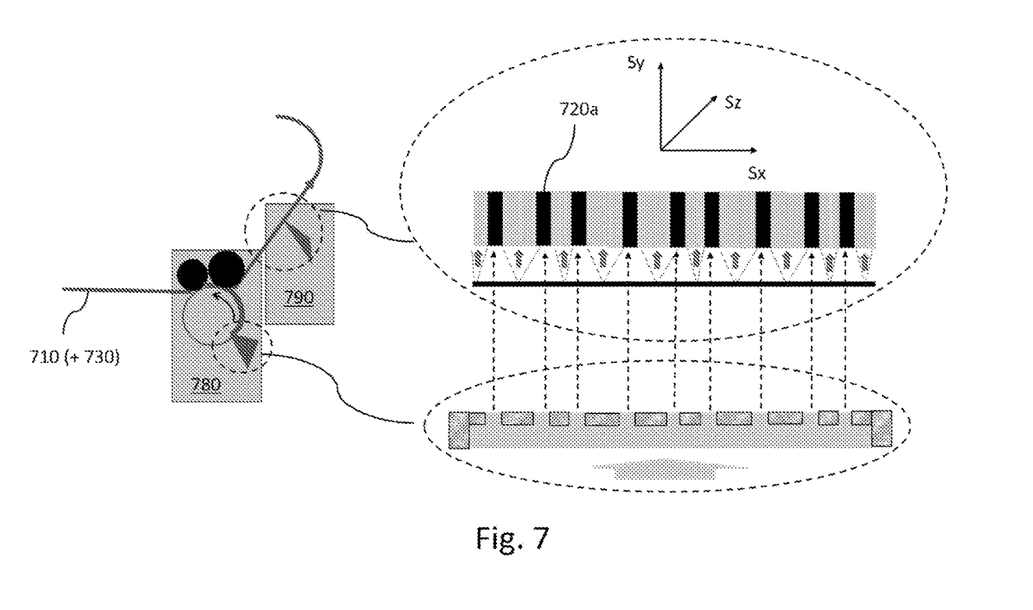
FIG. 7 illustrates, by way of an example, a detail of a manufacturing method and an apparatus according to another embodiment.

Alternatively, the patterned adhesive may be provided applying the water-based adhesive coating 720a only locally onto the face stock 710 so as to provide the face stock 710 with alternating adhesion areas and adhesion-free areas in the transversal direction of the face stock. This is illustrated in FIG. 7. The adhesion areas, i.e. the adhesive stripes are visualized as black blocks in FIG. 7. Thus, the face stock 710 is pattern coated with the adhesive coating. In order to prevent activation of the thermal paper while drying the adhesive, moisture is provided onto the adhesion-free areas of the face stock prior to drying of the water-based adhesive coating into the pressure sensitive adhesive. Moisture may be provided by a unit 790, the unit 790 in this case being a water sprayer. The water sprayer is arranged to provide a water spray solely on the adhesion-free areas, as illustrated by the grey, broad arrows in FIG. 7. In this embodiment the adhesion-free areas may also be called adhesive-free areas.

As illustrated in dashed enlargements of FIG. 7, the adhesive coating 720a is coated onto the face stock 710 in continuous, parallel stripes running in machine direction, i.e. in longitudinal direction of the label web. The adhesive may be coated using a contact coating method, such as roll coating, wherein the adhesive is coated onto a transfer roll using a nozzle. The nozzle may be arranged with blocking shims (seen as blocks filled with slanted lines in FIG. 7) allowing the adhesive coating to be delivered only onto certain cross-directional positions on the transfer roll. Therefore, the adhesive coating on the face stock 710 also becomes patterned. The adhesive pattern may be changed per need by adjusting or changing the blocking shims in the nozzle.

Width of the label web is typically a multiple of the final customer roll width. The width of the face stock may be, for example, from 1 to 3 metres. Therefore the face stock may be arranged with multiple adhesive stripes in order to provide multiple individual label widths. Afterwards the wider web width of the machine roll produced in this manufacturing process is to be slit into a correct customer roll width, for example having a width of 20-100 mm. A single machine roll may be arranged with different adhesive patterns in different cross-directional positions (adhesive stripe locations) and thus used to produce different type of customer rolls. The slitting process may be used further to provide different adhesive stripe positions.

Referring back to FIG. 4 and in view of FIGS. 5-7, it is possible that steps 402-404 may take place in various order. For example and as already explained the amount of moisture meeting the pre-determined level of moisture may be achieved when the water-based adhesive is coated onto the label web and partly removed via blading before entering drying 405. It is also possible that areas wherefrom the adhesive have been removed or which areas have been left completely without adhesive in the first place are arranged with pre-determined level of moisture either before and/or after the adhesive coating but however before entering drying 405. It is also possible that even the areas provided with adhesive are provided with additional moisture either before and/or after the adhesive coating but again before entering drying 405.

It is to be understood that the pre-determined level of moisture depends on the drying temperatures and the target level for the moisture is to be selected such that during drying the evaporation of the moisture maintains the temperature of the thermal sensitive coating, i.e. the direct thermal printable coating below its activation temperature. The critical indication for this temperature is the exit temperature of the label web when exiting the drying phase.

The adhesive is dried on the face stock. As a result of drying the pressure sensitive adhesive is obtained. The adhesive is dried in order to evaporate water from the water based adhesive. The adhesive may be dried using at least one of the following: infrared energy, microwave energy or air blow. Drying comprises heating. Heating may be implemented by at least one of the following: infrared heating, microwave heating or air blow. Preferably the adhesive is dried by air blow or by air blow together with another type of drying. The another type of drying may comprise infrared energy and/or microwave energy. The drying phase of the machine comprising the drying unit(s) may have a total length of between 20 and 30 metres.

The adhesive coating 520a, 620a, 720a is dried in at least one drying unit 560. The drying unit 560 may have a temperature of between 60 and 90 degrees C. or in some cases even higher up to and above 100 degrees C. Preferably the drying temperature is at least 75 degrees C. in order to ensure that the water-based adhesive becomes fully dried and provides maximum adhesive performance such as adhesion. The drying temperature, i.e. the temperature of the drying unit(s) may be adjusted according to the adhesive and/or the face stock in question. In a case more than one drying units are used, temperature of each of the drying units may be arranged to be same or differ from each other. The face stock 510, 610, 710 comprising the adhesive coating 520a, 620a, 720a thereon may be arranged to proceed through the drying unit 560. Thus, a linerless label web 500 is formed. At a point where the face stock having the adhesive thereon, i.e. the linerless label web 500 exits the drying unit 560, temperature of the adhesion-free area of the face stock may be for example 75 degrees C. Temperature of the adhesion-free area of the face stock may be arranged to be below 80 degrees C. throughout the manufacturing process. This may be achieved by for example by arranging enough moisture on the adhesion-free area(s) of the face stock before drying the adhesive and/or adjusting the temperature of the drying unit(s) and/or adjusting the machine speed of the process and/or adjusting the distance and/or the dwell time between applying the adhesive and removing the adhesive.

Temperature of the linerless label web when exiting thermal drying may be arranged to be from 5 to 15 degrees C. below an activation temperature of the direct thermal printable coating. Additionally or alternatively, the water-based adhesive coating may be dried at a temperature that is at least 10 degrees C. higher than the temperature of the linerless label web when exiting thermal drying. In other words, the drying temperature may be at least 10 degrees C. higher than the temperature of the linerless label web when exiting thermal drying. From economical point of view, it may be preferable to arrange the temperature of the linerless label web when exiting thermal drying to be as close to the activation temperature of the direct thermal printable coating as possible.

Drying window may be made longer by providing extra moisture with water spray.

After drying of the adhesive, the face stock with the pressure sensitive adhesive thereon, i.e. the linerless label web is wound onto a roll of linerless label web 570.

Typical linerless label web customer roll consisting of a single label width may have a width of 57 or 102 mm. Total PSA coverage in a cross-direction of a label web may be less than 70%, or less than 50% or even less than 30%. PSA may be arranged in one or more stripes in the cross-direction of the label web leaving one or more adhesion-free area(s) between the PSA stripes continuous in the longitudinal direction.

For some end uses it may be essential to leave in the machine-direction continuous adhesion-free areas/stripes near the longitudinal edges of the label web. These adhesion-free areas/stripes should correspond to minimum of 30%, or of 50% or even more than 70% of the total width of the label web. The adhesion-free areas/stripes may be arranged symmetrically or nearly symmetrically on both longitudinal edges of the label web. If the width of the adhesion-free areas is selected to be non-symmetric, the narrower of these areas on either longitudinal edge of the label web should correspond to minimum of 10%, 15%, 25% or even more than 35% of the total width of the label web.

The invention claimed is:

1. A method for manufacturing a linerless label web (100, 200, 500) comprising a direct thermal printable coating and a patterned pressure sensitive adhesive (120), wherein the method comprises
arranging a substrate comprising the direct thermal printable coating as a face stock (110, 510, 610, 710),
applying water-based adhesive coating (520a, 620a, 720a) onto the face stock (110, 510, 610, 710), providing the face stock (110, 510, 610, 710) with alternating adhesion areas and adhesion-free areas in a transversal direction of the face stock,
ensuring the adhesion-free areas with a pre-determined level of moisture, and
thermally drying the water-based adhesive coating (520a, 620a, 720a) into the pressure sensitive adhesive (120).

2. The method according to claim 1, comprising
first applying the water-based adhesive coating (520a, 620a, 720a) onto 100% area of the face stock (110, 510, 610, 710),
removing some of the water-based adhesive coating (520a, 620a, 720a) from the face stock (110, 510, 610, 710) prior to drying so as to provide the face stock (110, 510, 610, 710) with alternating adhesion areas and adhesion-free areas in the transversal direction of the face stock.

3. The method according to claim 2, comprising removing the water-based adhesive coating (520a, 620a, 720a) by a wiping blade, the blade being arranged at a wiping angle of 75-85 degrees with respect to the face stock (110, 510, 610, 710).

4. The method according to claim 2, wherein the adhesion-free areas comprise a residual amount of the water-based adhesive coating (520a, 620a, 720a) in a range of 0.5-5.0 g/m².

5. The method according to claim 2, wherein a dry weight content of the water-based adhesive coating after being removed from the face stock (110, 510, 610, 710) is 0.1-5% lower than a dry weight content of the water-based adhesive coating (520a, 620a, 720a) applied onto the face stock (110, 510, 610, 710).

6. The method according to claim 2, wherein a machine speed is 100-600 m/min and a dwell time between applying the water-based adhesive coating (520a, 620a, 720a) and removing the water-based adhesive coating is from 0.05 to 3 seconds.

7. The method according to claim 1, comprising
applying the water-based adhesive coating (520a, 620a, 720a) locally onto the face stock (110, 510, 610, 710) so as to provide the face stock (110, 510, 610, 710) with alternating adhesion areas and adhesion-free areas in the transversal direction of the face stock,
providing moisture to the adhesion-free areas of the face stock prior to drying of the water-based adhesive coating (520a, 620a, 720a).

8. The method according to claim 7, wherein the moisture is provided by spraying water on the adhesion-free areas of the face stock.

9. The method according to claim 1, wherein the water-based adhesive coating (520a, 620a, 720a) is dried at a temperature of between 60 and 100 degrees C.

10. The method according to claim 1, wherein temperature of the adhesion-free areas is arranged to be below 80 degrees C.

11. The method according to claim 1, wherein temperature of the linerless label web (100, 200, 500) when exiting thermal drying is arranged to be from 5 to 15 degrees C. below an activation temperature of the direct thermal printable coating.

12. The method according to claim 1, wherein the water-based adhesive coating (520a, 620a, 720a) is dried at a temperature that is at least 10 degrees C. higher than the temperature of the linerless label web (100, 200, 500) when exiting thermal drying.

* * * * *